March 30, 1954 P. CUNNINGHAM ET AL 2,673,570
SLUSH PUMP VALVE WITH CLIP RETAINING MEANS
Filed Sept. 9, 1952

Paul Cunningham
William M. King
INVENTORS

BY *(signatures)*
Attorneys

Patented Mar. 30, 1954

2,673,570

UNITED STATES PATENT OFFICE 2,673,570

SLUSH PUMP VALVE WITH CLIP RETAINING MEANS

Paul Cunningham and William M. King, Odessa, Tex.

Application September 9, 1952, Serial No. 308,628

3 Claims. (Cl. 137—543.13)

The present invention relates to new and useful improvements in slush pump valves and has for its primary object to provide, in a manner as hereinafter set forth, a device of this character comprising a resilient rubber sealing ring or insert which, when desired, may be expeditiously reversed, thereby substantially doubling the life of said insert.

Another very important object of the invention is to provide a slush pump valve of the aforementioned character which embodies unique means for locking the insert and other parts of the assembly together.

Still another important object of the invention is to provide a slush pump valve of the character described which embodies means for supporting and protecting the rubber insert in a manner to prolong the life thereof.

Other objects of the invention are to provide a slush pump valve which will be relatively simple in construction, strong, durable, highly efficient and reliable in use, compact, and which may be manufactured at low cost.

All of the foregoing and still further objects and advantages of the invention will become apparent from a study of the following specification, taken in connection with the accompanying drawings wherein like characters of reference designate corresponding parts throughout the several views; and wherein.

Figure 1:
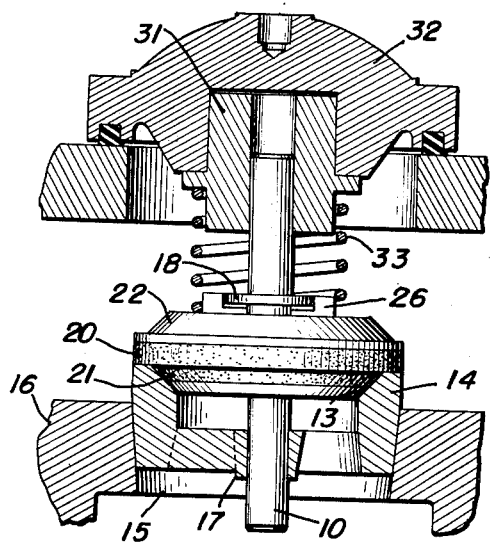
Figure 1 is a view in vertical section through a portion of a slush pump showing, in elevation, a valve constructed in accordance with the present invention.
Figure 4:
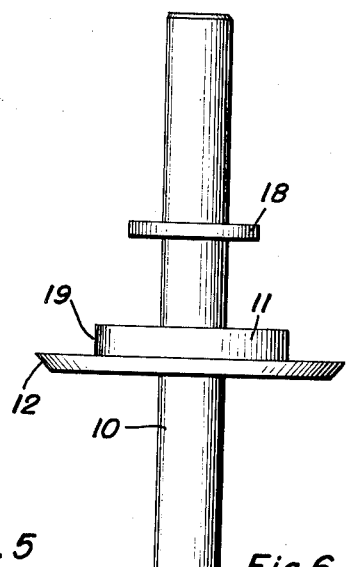
Figure 4 is an elevational view of the stem and the parts which are integral therewith.
Figure 2:
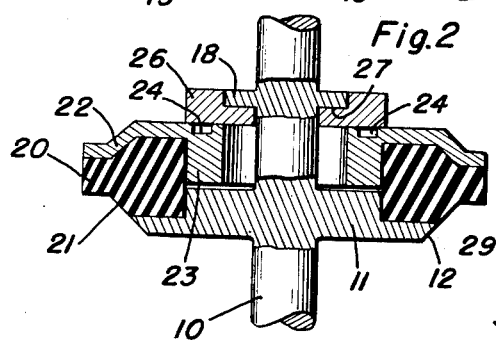
Figure 2 is a vertical sectional view through the valve.
Figure 5:
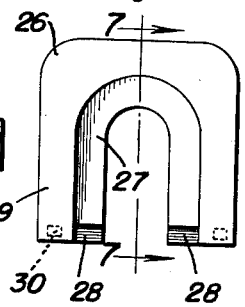
Figure 5 is a detail view in top plan of the locking clip.
Figure 6:
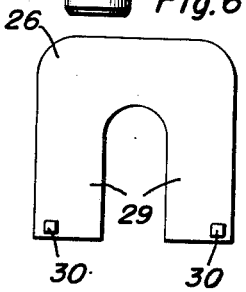
Figure 6 is a bottom plan view of the locking clip.
Figure 3:
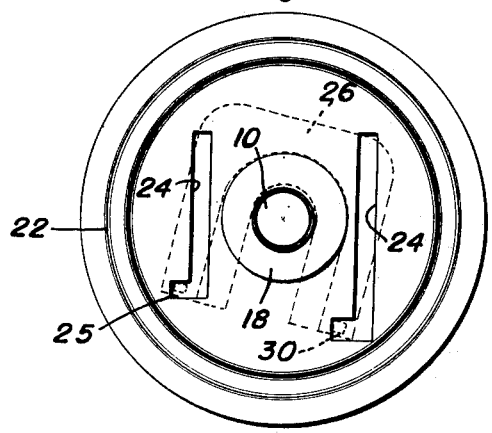
Figure 3 is a top plan view thereof.
Figure 7:
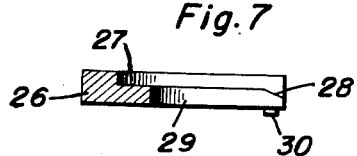
Figure 7 is a vertical sectional view through the locking clip, taken substantially on the line 7—7 of Figure 5.

Referring now to the drawing in detail, it will be seen that the embodiment of the invention which has been illustrated comprises a metallic stem 10 of suitable dimensions. Formed integrally with the stem 10 at an intermediate point is a body 11 which includes a bevelled periphery 12 for engagement with the face 13 of a conventional seat 14 which is mounted in the usual opening 15 provided therefor in the slush pump wall 16. The seat 14 further includes a guide 17 in which the lower portion of the stem 10 is slidably engaged. Also formed integrally with the stem 10, in spaced relation above the body 11, is a flange 18. The body 11 further includes, in its upper portion, a marginal rabbet 19 providing an annular seat for the lower portion of a removable and reversible rubber sealing ring or insert 20. The sealing ring or insert 20 comprises upper and lower faces 21 which are shaped to conform to the upper portion of the seat 14 with which they are engageable.

Removably mounted on the sealing ring 20 and conforming to the shape thereof is a metallic plate or cap 22. The cap 22 is in the form of a ring and comprises a depending, annular hub portion 23 which extends downwardly into the sealing ring 20 in spaced, concentric relation to the stem 10. The upper face of the cap 20 has formed therein spaced, parallel grooves 24 which terminate in angularly extending end portions 25.

The assembly is secured through the medium of a substantially U-shaped metallic locking clip 26. The clip 26 is forced horizontally between the flange 18 and the cap 22, thus compressing the rubber sealing ring 20 between said cap 22 and the body 11. Toward this end, the inner marginal portion of the substantially U-shaped locking clip 26 is rabbeted, as at 27, for the reception of the flange 18. The end portions of the rabbeted portion 27 of the clip 26 are bevelled, as at 28, to facilitate insertion beneath the flange 18. Depending from the free end portions of the legs 29 of the clip 26 are integral lugs 30 which are operable in the grooves 24 and engageable in the angularly directed end portions 25 thereof for securing said clip in locking position.

It is thought that the invention will be readily understood from a consideration of the foregoing. Briefly, the construction and arrangement is such that when the locking clip 26 is forced home beneath the flange 18, the sealing ring 20 will be compressed between the members 11 and 22. It is to be noted that the cap 22 covers the entire area of the sealing ring 20 for firmly supporting and protecting said ring. To remove the sealing ring 20 for reversing same when the lower face thereof becomes worn or damaged, the clip 26 is rotated about the stem 10 in a direction to disengage the lugs 30 from the angularly extending end portions 25 of the grooves 24. The locking clip may then be readily withdrawn from between the flange 18 and the cap 22, the lugs 30 travelling in the grooves 24. The members 22 and 20 may then be readily removed for reversing the latter. The upper end portion of the stem 10 is slidably engaged in the usual bushing 31 in the cap 32 of the slush pump. The reference numeral 33 designates a coil spring which yieldingly seats the valve. Of course, to reassemble the valve, the foregoing operation is reversed.

It is believed that the many advantages of a slush pump valve constructed in accordance with the present invention will be readily understood and although a preferred embodiment of the device is as illustrated and described, it is to be understood that changes in the details of construction may be resorted to which will fall within the scope of the invention as claimed.

Having described the invention, what is claimed as new is:

1. A slush pump valve comprising a stem, a body on the stem for engagement with a seat, a reversible sealing ring mounted on the body and engageable with the seat, an annular pressure plate mounted on the sealing ring, said plate having parallel grooves therein terminating in angularly extending end portions, a flange on the stem in spaced relation above the body, and means for securing the plate and ring in position on the body, said means comprising a substantially U-shaped clip engageable between the flange and the plate, said clip including a rabbeted inner marginal portion for the reception of the flange, and lugs on the clip operable in the grooves and engageable in the angularly extending end portions thereof for anchoring said clip in locking position.

2. A slush pump valve comprising a stem, a body on said stem for engagement with a seat, a flange on the stem spaced from the body, a sealing ring on the body engageable with the seat, a removable pressure plate mounted on said sealing ring, said plate having parallel grooves therein terminating in angularly directed end portions, and a clip engageable between the flange and the plate for securing said plate in position, said clip including lugs operable in the grooves and engageable in the angularly directed end portions thereof for anchoring said clip in locking position.

3. A slush pump valve comprising a stem, a body on said stem for engagement with a seat, a flange on the stem spaced from the body, a sealing ring on the body engageable with the seat, a removable pressure plate mounted on said sealing ring, a clip engageable between the flange and the plate for securing the plate in position, said plate having a groove therein including an angularly directed end portion, a lug on said clip operable in said groove and engageable in the angularly directed end portion thereof for anchoring the clip in position.

PAUL CUNNINGHAM.
WILLIAM M. KING.

References Cited in the file of this patent

UNITED STATES PATENTS

| Number | Name | Date |
| --- | --- | --- |
| 691,477 | Murphy | Jan. 21, 1902 |
| 1,598,551 | Brauning | Aug. 31, 1926 |
| 1,707,017 | Kibele | Mar. 26, 1929 |
| 1,796,252 | Greve | Mar. 10, 1931 |
| 1,990,557 | Melott | Feb. 12, 1935 |
| 2,244,427 | Miller | June 3, 1941 |